Aug. 15, 1967 R. A. BOWN 3,335,679
COLLAPSIBLE TRAY ASSEMBLY FOR VEHICLE SEATS
Filed June 23, 1966
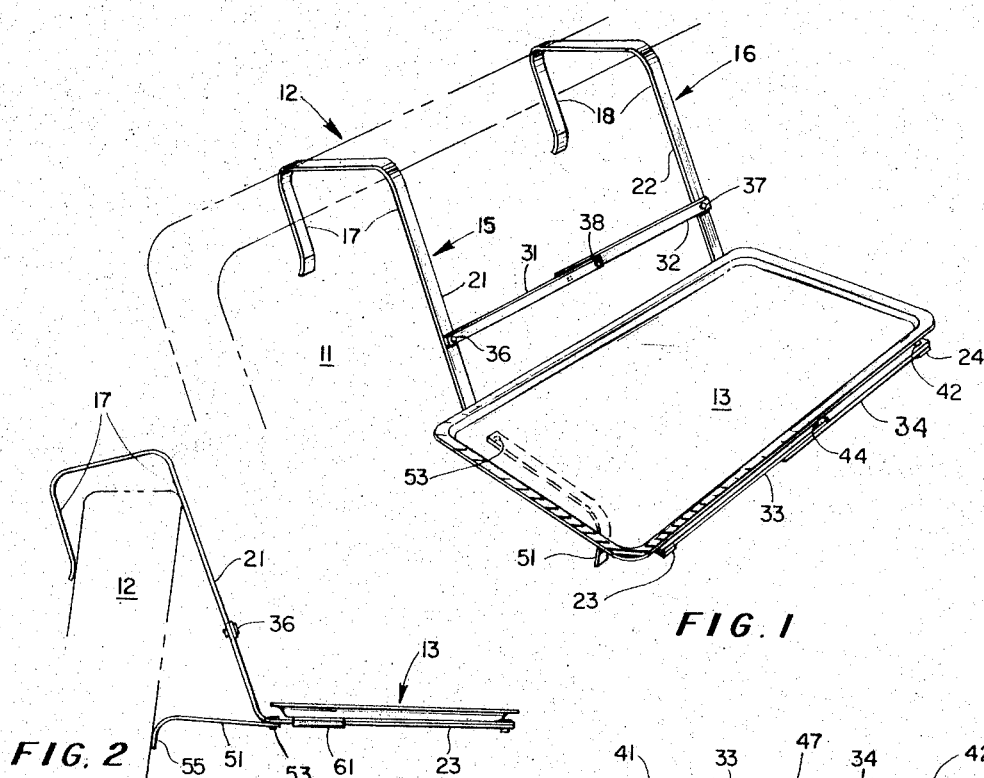
FIG. 1
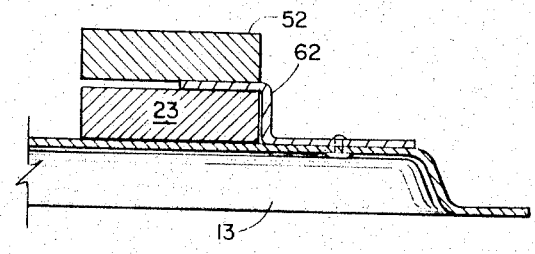
FIG. 2
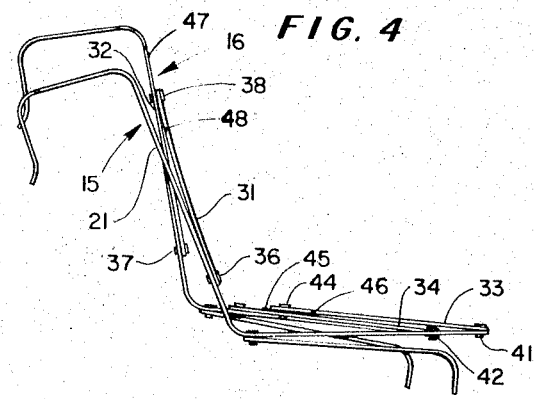
FIG. 4
FIG. 5
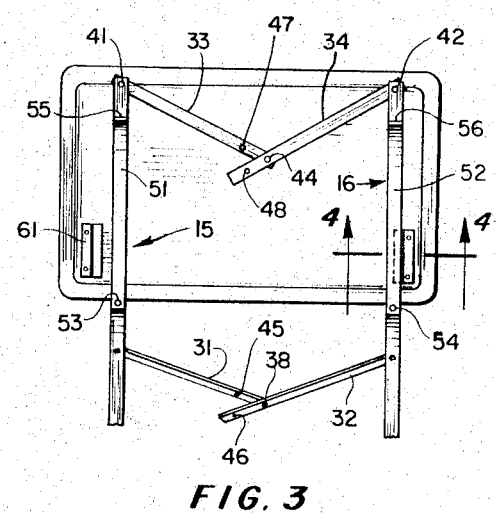
FIG. 3
INVENTOR.
RONALD A. BOWN
BY
*[signature]*
ATTORNEYS

United States Patent Office 3,335,679
Patented Aug. 15, 1967

3,335,679
COLLAPSIBLE TRAY ASSEMBLY FOR VEHICLE
SEATS
Ronald A. Bown, 1030 W. 1st Ave.,
Broomfield, Colo. 80020
Filed June 23, 1966, Ser. No. 560,007
6 Claims. (Cl. 108—44)

My invention relates to collapsible tray assemblies and more particularly to improvements in collapsible tray assemblies for supporting various types of articles such as food and drink refreshments from the seat of a motor vehicle.

There are presently available various types of trays, tables or stands which support food and drink refreshments usually from the seat of a motor vehicle. These refreshments are usually served at wayside stops while the car is used in long distance travel. Such food and drink refreshment supporting means must be sufficiently durable and stable to avoid spilling of supported articles, must be easily removed from the vehicle seat when not in use and should be capable of convenient storage within the motor vehicle such as in the trunk or other available storage space when not in use.

Accordingly, it is an object of my invention to provide a simple, durable and easy to use tray assembly suitable for support by a vehicle seat or the like.

It is another object of my invention to provide a novel tray assembly which is easily collapsed and in which the tray member is detached from the frame assembly for storage purposes.

It is another object of my invention to provide an improved tray assembly which may be easily assembled from a collapsed position and conveniently attached in a depending manner adjoining the front or rear surface of the upright portion of a vehicle seat to support articles in an area either forwardly or rearwardly of the upright back portion of the vehicle seat.

Other objects, advantages and capabilities of the invention will become apparent from the following description taken in conjunction with the accompanying drawings showing only a preferred embodiment of the invention. In the drawings:

FIG. 1 is a perspective view of an improved collapsible tray assembly embodying my invention shown supported in a depending manner from the front side of the upright portion of a front vehicle seat to support articles in an area forwardly thereof;

FIG. 2 is a side elevation of the collapsible tray assembly and seat portion shown in FIG. 1 supported in a depending manner from the rear side of the upright portion of a vehicle seat to support articles in an area rearwardly thereof;

FIG. 3 is a bottom plan view of the tray assembly of FIGS. 1 and 2 showing the frame member in a partially collapsed position with respect to the tray member;

FIG. 4 is a sectional view taken along lines 4—4 of FIG. 3 showing the position of one support are with respect to the strap member in the open position for holding or locking the tray member to the frame member; and FIG. 5 is a top plan or side elevation view of the frame member in a collapsed position with the tray member removed to provide for convenient storage of the tray assembly when not in use.

Referring now to the drawings, there is shown a tray assembly comprising in general a frame member 11 attached to an upright backing member 12 such as the upright back portion of the seat of an automobile and the like which supports the tray member 13 in a substantially horizontal position adjoining the seat portion 12. The seat portion 12 is inclined rearwardly and is illustrated and hereinafter referred to as the front seat of the motor vehicle and in the position shown in FIG. 1 the tray member 13 is supported in a substantially horizontal position adjoining the forward or front side of the seat to support articles in an area forwardly thereof.

The frame member includes support arms 15 and 16 having seat-engaging upper portions 17 and 18 which are generally hook-like and fit over the top of and engage the front and rear back surface portions of the seat, intermediate portions 21 and 22 which depend from the upper portions 17 and 18, respectively, and front seat access position shown in FIG. 1 engage the forward upright seat surfaces, and lower portions 23 and 24 which extend from intermediate portions 21 and 22, respectively, and extend transversely of the forward surfaces of the seat to support the tray member in a depending manner therefrom in a substantially horizontal position.

The support arms 15 and 16 are joined in coacting relationship at their intermediate portions 21 and 22 by an upper pair of links or link members 31 and 32 and at the extremities of lower portions 23 and 24 by a lower pair of links 33 and 34. The upper link 31 is pivotally joined at one end to intermediate portion 21 by a connecting member 36 such as a rivet or bolt and nut assembly and the like. Upper link 32 is pivotally joined at one end to intermediate portion 22 by a connecting member 37 as is link 31. The upper pair of links 31 and 32 are pivotally joined at their adjoining ends by a connecting member 38 illustrated as a rivet and may also be a detachable bolt and nut assembly and the like.

In a like manner the lower link 33 is pivotally joined at one end to the lower end of lower portion 23 by a connecting member 41 and lower link 34 is pivotally joined at one end to the lower end of lower portion 24 by a connecting member 42. The lower pair of links 31 and 32 are pivotally joined at their adjoining ends by a connecting member 44.

An arrangement is provided for locking or holding the frame member in the open position for supporting the tray member in the manner shown in FIG. 1. In the arrangement shown the upper link member 32 extends beyond the connection member 38 and is provided with a raised portion 46 at its end which fits into an adjoining recessed portion 45 between the ends of the upper link member 31 in a close fitting relationship for locking or holding the upper coacting pair of links substantially end to end in a common plane. Similarly, the lower link member 34 extends beyond the connection member 44 and is provided with a raised portion 48 at its end which fits into an adjoining recessed portion 47 between the ends of lower link member 33 in close fitting relationship for locking or holding the lower coacting pair of links substantially end to end in a common plane. Recessed portions 45 and 47 are preferably shallow indentations in the link members and do not extend entirely therethrough. When the respective raised portions are moved out of the recessed portions and pivoted about the respective connecting members 38 and 44, then the frame member is moved by the upper and lower coacting pair of links to first release the tray member 13 and then to a fully collapsed position as more fully described hereinafter.

The upper and intermediate portions 17, 18, and 21, 22 of the frame member are shaped with a rearward inclination to conform with the rearward inclination of forward and rearward upright surfaces of seat portion 12 so as to maintain the lower tray member supporting portions 23 and 24 substantially horizontal when the tray member is disposed in the front seat position as shown in FIG. 1.

Adjustable support arms 51 and 52 are pivotally connected by connecting members 53 and 54 to the undersurface of the frame of lower portions 23 and 24, respectively, for adjusting the frame member to seats having different angles of inclination and thicknesses and is particularly suitable for properly positioning the frame member with respect to the seat portion 12 having a reverse and forward inclination as viewed from the rear side of the seat portion 12 for supporting the tray member in a substantially horizontal position adjoining the rear side of the seat to provide access to supported articles for persons seated in the rear seat of the motor vehicle. This reverse position of the frame member is easily accomplished by merely raising and turning around the hook-like upper portions of the frame member.

Adjustable support arms 51 and 52 include arcuate end portions 55 and 56, respectively, oppositely of their pivotal ends which extend outwardly and oppositely of the lower portions 23 and 24 and engage the rear side of the seat portion 12 and coact with the hook-like upper portions 17 and 18 of the frame member to support the tray member at the rear side of the seat as shown in FIG. 2.

Support arms 51 and 52 pivot about connecting members 53 and 54 from the extended seat-engaging position shown in FIG. 2 to an oppositely retracted or inactive position under and alined with the lower portions 23 and 24 of the frame member as shown in FIGS. 1 and 5.

While it is preferable to have the adjustable support arms 51 and 52 pivotally connected to the frame member 11 as shown to accommodate seats of different thicknesses and inclination it is understood they could also be supported from the tray member to bear against the seat.

Referring now particularly to FIG. 3, there is provided an arrangement for securing the tray member 13 to the frame member 11. The undersurface of the tray member 13 is provided with oppositely disposed coacting strap members 61 and 62 which are rigidly secured to the undersurface of the tray member by rivets or the like and extend upwardly and inwardly and are open to their inner sides to provide lengthwise and endwise abutting surfaces which cooperate with the lower surface of the tray member 13 for engaging the surfaces of the coacting support arms 15 and 16 when moved to the open position for locking the tray member on the frame member. These support arms 15 and 16 intermediate the ends of lower portions 23 and 24 are slid into the strap members 61 and 62 when these support arms are extended into the locked position and then slide out of the strap members 61 and 62 when moved as shown in FIG. 3 to a semi-collapsed position.

Referring now to FIG. 5, the frame member is shown with the tray member 13 removed with the coacting support arms in an adjoining position and the link pairs pivoted about their common connection pivot member so that the pair of links are in a folded position. This collapsed arrangement provides for convenient storage of the frame member 11 and tray member 13 when the tray assembly is not in use, such as in the trunk of the vehicle or in other storage locations and may be easily reassembled by expanding the coacting pair of links about their pivotal connection to the open position illustrated in FIG. 1 wherein the tray member 13 is locked on the frame member 11 by the strap members 61 and 62.

Other changes and modifications may be availed of within the spirit and scope of the invention as set forth in the hereunto appended claims.

I claim:

1. A collapsible article support tray assembly for use with vehicle seats and the like, comprising a tray member, a collapsible frame member for supporting said tray member in a substantially horizontal position adjoining a seat having an upright back portion, said frame member including coacting support arms having seat engaging portions at one end for attaching the frame member to the seat back portion and tray member engaging portions at the other end extending in generally transverse relation to an adjoining upright portion of said seat engaging portion for supporting the tray member when disposed in an open position, said support arms joined by adjustable linking means for holding the support arms in substantially spaced relation in the open position and movable to a second closely adjoining collapsed position, said linking means including spaced upper and lower link members disposed between said coacting support members and adapted for conjoint change in length by forces applied to said support arms, said upper link member joining opposing portions of said seat back portion and said lower link member joining opposing portions of said tray engaging portions of said support arms, and one of said tray and frame members having means for locking said tray member to said support arms in the open position and for releasing the tray member from the frame member in the collapsed position.

2. A collapsible article support tray assembly as set forth in claim 1 wherein said seat engaging portions of the support arms are generally hook-like in shape and hook over the top and upper side surfaces of the seat back portion to support the frame member in a generally depending manner from the seat.

3. A collapsible article support tray assembly as set forth in claim 1 including means for locking the linking means in said open position during the support of said tray member.

4. A collapsible article support tray assembly for use with vehicle seats and the like, comprising a tray member, a collapsible frame member for supporting said tray member in a substantially horizontal position adjoining a seat having an upright back portion, said frame member including coacting support arms having seat engaging portions at one end for attaching the frame member to the seat back portion and tray member engaging portions at the other end for supporting the tray member when disposed in an open position, said support arms joined by adjustable linking means for holding the support arms in substantially spaced relation in the open position and movable to a second closely adjoining collapsed position, said linking means including at least one pair of link members pivotally joined at opposite ends to opposite sides of the coacting support arms and pivotally joined at a common end so as to hold the support arms in a spaced parallel open position when the pair of link members are disposed substantially end to end in a common plane and to move the support arms about the common pivot to hold the support arms in an adjoining collapsed position when the link members are disposed in a folded overlapping position, and one said member having means for locking said tray member to said support arms in the open position and for releasing the tray member from the frame member in the collapsed position.

5. A collapsible article support tray assembly for use with vehicle seats and the like, comprising a tray member, a collapsible frame member for supporting said tray member in a substantially horizontal position adjoining a seat having an upright back portion, said frame member including coacting support arms having seat engaging portions at one end for attaching the frame member to the seat back portion and tray member engaging portions at the other end for supporting the tray member when disposed in an open position, said support arms joined by adjustable linking means for holding the support arms in substantially spaced relation in the open position and movable to a second closely adjoining collapsed position, and one said member having means for locking said tray member to said support arms in the open position and for releasing the tray member from the frame member in the collapsed position, said means for locking said tray member to said support arms including coacting strap-like members secured to the undersurface of the tray member at opposite sides thereof, and each shaped to receive an adjoining support arm in slide-fitting relationship with the undersurface of the tray member and having an end surface for abutting against the respective outer sides of the support arms when the linking means is disposed in said open position.

6. A collapsible article support tray assembly for use with vehicle seats and the like, comprising a tray member, a collapsible frame member for supporting said tray member in a substantially horizontal position adjoining a seat having an upright back portion, said frame member including coacting support arms having seat engaging portions at one end for attaching the frame member to the seat back portion and tray member engaging portions at the other end for supporting the tray member when disposed in an open position, said support arms joined by adjustable linking means for holding the support arms in substantially spaced relation in the open position and movable to a second closely adjoining collapsed position, one said member having means for locking said tray member to said support arms in the open position and for releasing the tray member from the frame member in the collapsed position, and adjustable means supported by one of said members for engaging the seat at selected positions to retain the tray member in a substantially horizontal position for seats of different angles of inclination.

References Cited

UNITED STATES PATENTS

| | | | |
|---|---|---|---|
| 1,743,406 | 1/1930 | Stone | 108—44 |
| 2,640,597 | 6/1953 | Thompson | 108—112 |
| 2,682,438 | 6/1954 | Davis | 108—47 |
| 2,687,336 | 8/1954 | Smith et al. | 297—163 |
| 2,693,400 | 11/1954 | Erickson | 108—9 |
| 3,050,355 | 8/1962 | Hess et al. | 108—135 X |

DAVID J. WILLIAMOWSKY, *Primary Examiner.*

FRANK B. SHERRY, *Examiner.*

G. O. FINCH, *Assistant Examiner.*